US012762024B1

(12) United States Patent
Corbett et al.

(10) Patent No.: US 12,762,024 B1
(45) Date of Patent: Oct. 13, 2026

(54) REDUCING COST OF METADATA STORAGE IN A SOLID STATE DRIVE-BASED STORAGE SYSTEM

(71) Applicant: Dell Products L.P., Round Rock, TX (US)

(72) Inventors: Peter Corbett, Lexington, MA (US); Philippe Armangau, Kalispell, MT (US); Max Laier, Seattle, WA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/189,075

(22) Filed: Apr. 24, 2025

(51) Int. Cl.

| | |
|---|---|
| ***G06F 11/1446*** | (2026.01) |
| ***G06F 11/14*** | (2006.01) |
| ***G06F 11/1471*** | (2026.01) |
| *G06F 11/10* | (2006.01) |

(52) U.S. Cl.
CPC ...... *G06F 11/1469* (2013.01); *G06F 11/1402* (2013.01); *G06F 11/1435* (2013.01); *G06F 11/1451* (2013.01); *G06F 11/1464* (2013.01); *G06F 11/1471* (2013.01); *G06F 11/1076* (2013.01); *G06F 11/108* (2013.01)

(58) Field of Classification Search
CPC ............. G06F 11/1435; G06F 11/1402; G06F 11/1471
See application file for complete search history.

(56) References Cited

U.S. PATENT DOCUMENTS

| | | | | |
|---|---|---|---|---|
| 11,144,221 | B1 * | 10/2021 | Lathrop | G06F 3/0631 |
| 11,625,183 | B1 * | 4/2023 | Armangau | G06F 3/0604 711/101 |
| 11,954,346 | B2 * | 4/2024 | Alkalay | G06F 11/108 |
| 12,056,391 | B2 * | 8/2024 | Zhao | G06F 3/061 |
| 2020/0241969 | A1 * | 7/2020 | Shveidel | G06F 11/1435 |
| 2020/0409583 | A1 * | 12/2020 | Kusters | G06F 11/0757 |
| 2021/0286684 | A1 * | 9/2021 | Nara | G06F 11/1435 |
| 2022/0129437 | A1 * | 4/2022 | Ma | G06F 16/14 |
| 2023/0004462 | A1 * | 1/2023 | Shao | G06F 11/1435 |
| 2023/0114368 | A1 * | 4/2023 | Behera | G06F 11/1004 714/19 |
| 2023/0185480 | A1 * | 6/2023 | Zhao | G06F 3/0679 711/154 |
| 2023/0359402 | A1 * | 11/2023 | Bernat | G06F 21/78 |
| 2024/0103984 | A1 * | 3/2024 | Yadav | G06F 11/1435 |
| 2024/0320098 | A1 * | 9/2024 | Zalstein | G06F 11/2056 |
| 2024/0419540 | A1 * | 12/2024 | Bajaj | G06F 11/1068 |
| 2025/0208954 | A1 * | 6/2025 | Mathew | G06F 11/1435 |

* cited by examiner

*Primary Examiner* — Jonathan D Gibson
(74) *Attorney, Agent, or Firm* — Amin, Turocy & Watson, LLP

(57) ABSTRACT

A system can store a first copy of metadata of data of a log storage system on performance drives of the log storage system that satisfy a performance criterion, wherein the first copy of the metadata satisfies an in-place criterion. The system can store a second copy of the metadata in a redundant array of inexpensive drives configuration and in a log structure on capacity drives of the log storage system that satisfy a capacity criterion. The system can serve a request to access at least a part of the metadata from the first copy of the metadata on the performance drives. The system can restore a data loss of the first copy of the metadata with the capacity drives.

20 Claims, 10 Drawing Sheets

200

| | In-place on performance drives | Log structured on capacity drives | Hybrid |
|---|---|---|---|
| % of capacity drive space sued for data | 100.0% | 96.7% | 96.7% |
| Related physical amount of meadata on performance drive | 8.00% | 0.00% | 2.58% |
| Minimum number of performace drives in 44-drive enclosure | 11 | 0 | 5 |
| Data capacity as a percentage of raw maximum with all capacity drives | 75.00% | 96.70% | 85.70% |
| Relative cost of storage v. all drives as capacity drives | 87.50% | 100.00% | 94.30% |
| Net logical data capacity normalized cost | 0.86 | 0.97 | 0.91 |

FIG. 2

300

| | |
|---|---|
| Drive cost factor (performance / capacity) ($/TB / $/TB) | 2 |
| Log percent deferred | 1% |
| Logical metadata footprint percentage | 3% |
| Capacity drive size ratio | 4 |
| Enclosure slot count | 44 |
| Metadata parity ratio | 1.25 |
| Data parity ratio | 1.125 |
| Metadata mirroring ratio | 3 |

FIG. 3

REDUCING COST OF METADATA STORAGE IN A SOLID STATE DRIVE-BASED STORAGE SYSTEM

BACKGROUND

Computer data can be stored in in a storage system on solid state drives (SSDs) that store the data with persistent flash memory. The storage system can also store metadata that describes properties of the data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can store a first copy of metadata of data of a log storage system on performance drives of the log storage system that satisfy a performance criterion, wherein the first copy of the metadata satisfies an in-place criterion. The system can store a second copy of the metadata in a redundant array of inexpensive drives configuration and in a log structure on capacity drives of the log storage system that satisfy a capacity criterion. The system can serve a request to access at least a part of the metadata from the first copy of the metadata on the performance drives. The system can restore a data loss of the first copy of the metadata with the capacity drives.

An example method can comprise storing, by a system comprising at least one processor, a first copy of metadata of data of a log storage system on performance drives that satisfy a performance criterion, wherein the first copy of the metadata satisfies an in-place criterion, and wherein the log storage system comprises the performance drives and capacity drives that satisfy a capacity criterion. The method can further comprise storing, by the system, a second copy of the metadata in a redundant array of inexpensive drives configuration and in a log structure on the capacity drives. The method can further comprise serving, by the system, a request to access at least a part of the metadata from the first copy of the metadata on the performance drives. The method can further comprise restoring, by the system, a data loss of the first copy of the metadata with the capacity drives.

An example non-transitory computer-readable medium can comprise instructions that, in response to execution, cause a system comprising a processor to perform operations. These operations can comprise storing a first copy of metadata of data of a log storage system on first drives that satisfy a performance criterion, wherein the first copy of the metadata satisfies an in-place criterion, and wherein the log storage system comprises the first drives and second drives that satisfy a capacity criterion. These operations can further comprise storing a second copy of the metadata in a redundant array of inexpensive drives configuration and in a log structure on the second drives. These operations can further comprise serving a request to access at least a part of the metadata from the first copy of the metadata on the first drives. These operations can further comprise restoring a data loss of the first copy of the metadata with the second drives.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates an example table that describes reducing cost of metadata storage in a solid state drive-based storage system, in accordance with an embodiment of this disclosure;

FIG. 3 illustrates another example table that describes reducing cost of metadata storage in a solid state drive-based storage system, in accordance with an embodiment of this disclosure;

DETAILED DESCRIPTION

Overview

Figure 1:
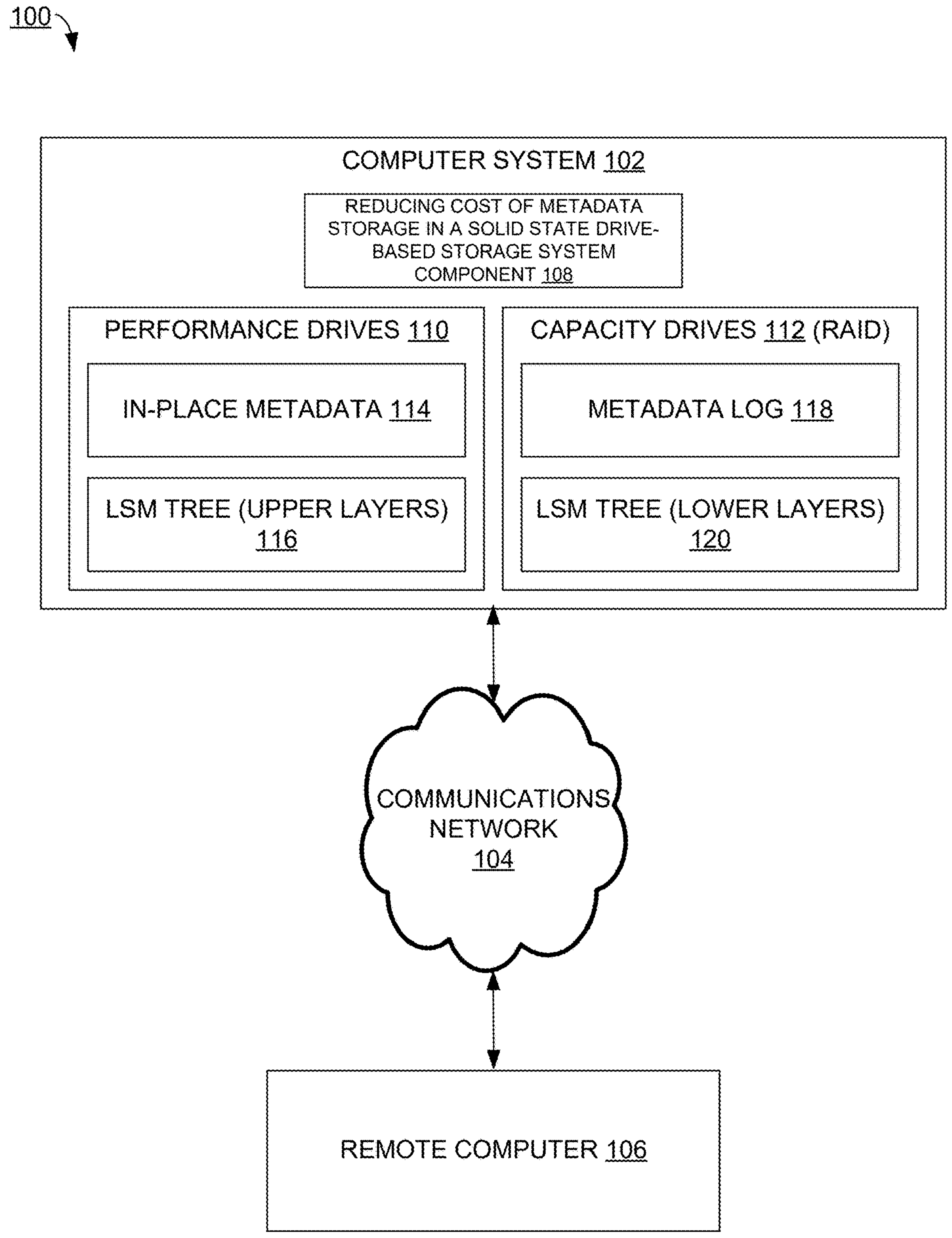
FIG. 1 illustrates an example system architecture that can facilitate reducing cost of metadata storage in a solid state drive-based storage system, in accordance with an embodiment of this disclosure.

There can be high-capacity solid state drives (SSDs) that have fundamentally different properties than prior SSDs. These newer SSDs can optimize (or improve) capacity, at the expense of wear tolerance, write bandwidth and read latency, and input-output operations per second (IOPS) capability. One aspect is that the increase in capacity can come at the expense of an increase in Indirection Unit (IU) size (where an indirection unit can comprise a contiguous group of storage blocks on an SSD that is addressed by one pointer, and that can be optimally written (recorded) as a unit; write amplification incurred by writes less than the IU size can generally be by a factor of IU size/write size), beyond 4 kibibytes (kiB). With each doubling of IU size (e.g., from 8 kiB and beyond) comes a doubling of drive write amplification induced by small random writes (e.g., 4 kiB and below). This amplification can result in lower performance, higher power consumption, and increased flash wear.

To offset this effect, two approaches can be considered. One approach is to log structure the metadata writes. Log structuring can allow the metadata updates to be written sequentially and in larger increments to the flash media. If the increments of writing are at least as large as the IU size, then write amplification can be eliminated (that is, equal to 1×).

This can introduce some challenges in metadata access performance relative to in-place metadata layouts. Another approach is to put the metadata on a different category of drive that does not have the limitations of the high capacity drives. This can have a disadvantage of reducing the overall capacity density of the system, as slots that could be populated with high-capacity drives are instead be populated with lower-capacity, high-performance, high-wear drives. To accommodate reliability requirements of metadata with a write-in-place layout, there could be at least three mirror copies of the metadata, involving at least three SSDs for metadata, and perhaps more in a larger system.

Another consideration in using high performance drives is that they can be more responsive to reads, providing both lower latency and higher I/O operations per second (IOps), both of which can be important to improve metadata read performance, which can be a key determinant of overall system performance.

The present techniques provide for one in-place active copy of metadata to be stored. This copy can be written in-place when metadata is modified, and can be addressed using indexing into direct-access tables, avoiding multi-step lookups. The same addressing can be used for reads, and this copy of the metadata can be used to service normal metadata read operations. As used herein, normal metadata read operations can be those where no error conditions are present, and can be viewed in contrast to where there is a media error, unavailability, or permanent loss.

Instead of two additional in-place copies, a single additional log-structured metadata copy can be kept. This copy can be protected using a redundant array of inexpensive drives (RAID) technique, reducing the capacity footprint. Furthermore, where this copy is not used to service metadata reads under normal conditions, and can be written as logs rather than as individual small blocks (4 kiB or less), this copy can be stored in the high-capacity drives. With this approach, one drive can be used rather than at least three drives.

Consider the following example with respect to computing the capacity lost and the additional cost of metadata storage if metadata is stored on a different class of SSD, with the following assumptions:

1. There are two categories of SSDs: Performance and Capacity;
2. Performance SSDs have ¼ the capacity of capacity SSDs;
3. Performance SSDs cost 2×/terabyte (TB) the cost of capacity SSDs;
4. The drives are housed in enclosures that hold 44 drives. The counts of each drive type in the enclosure adds to 44;
5. The logical footprint of metadata is 3% the size of the logical footprint of the data; and
6. The system will be sized to be filled to 100% of the capacity of either data or metadata drives, whichever limit is reached first.

With these assumptions in place, three options can be compared:

1. All metadata is 3× mirrored on high performance drives.
2. All metadata is log structured with RAID protection (8+2—8 data drives and 2 parity drives), on capacity drives with the top of the log either on performance drives or in persistent memory.
3. A hybrid configuration where metadata is stored in two places: An in-place copy on performance drives, and a RAID-protected log-structured copy on the capacity drives with the top of the log mirrored either on performance drives or in persistent memory. This configuration employs the disclosed technique.

A comparison of the results of these three options is illustrated in FIG. 2.

Figure 4:
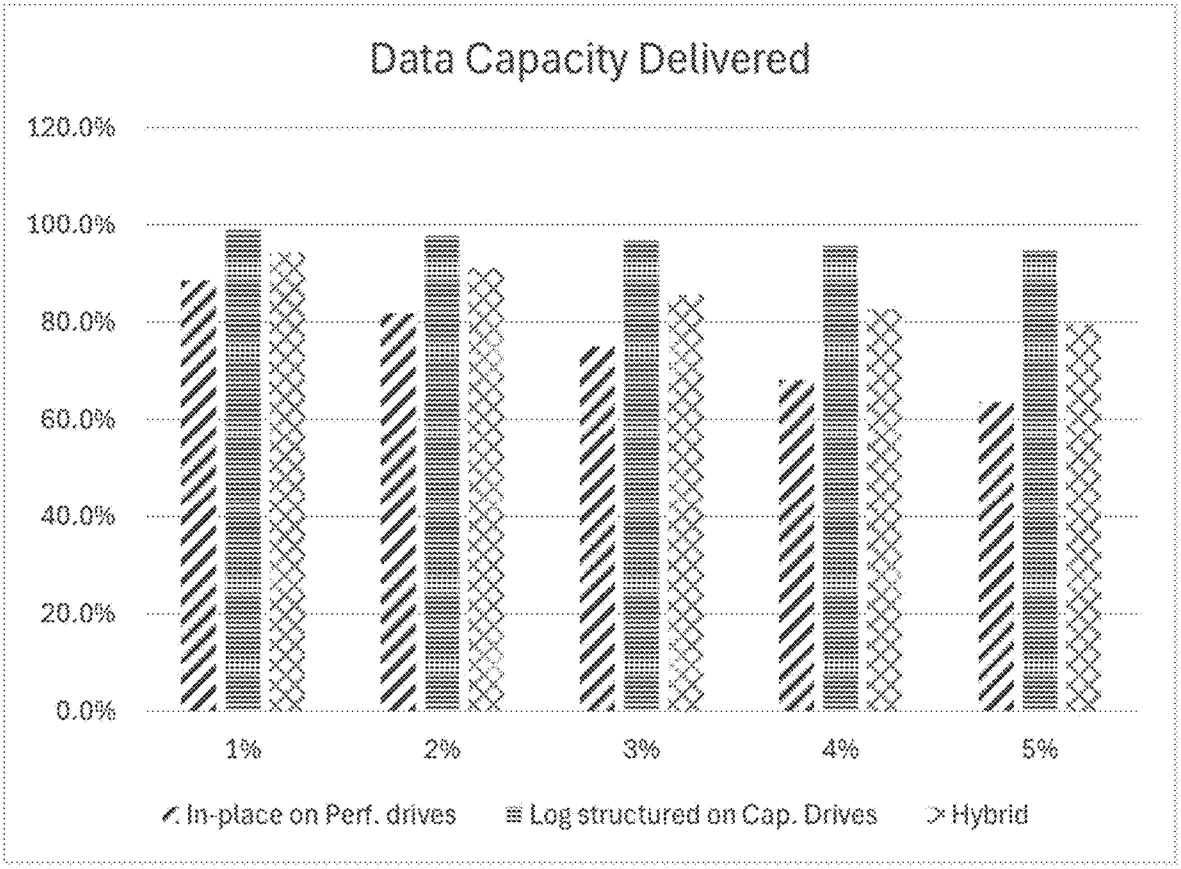
FIG. 4 illustrates an example chart of data capacity delivered, and that can facilitate reducing cost of metadata storage in a solid state drive-based storage system, in accordance with an embodiment of this disclosure.

As can be seen from the example of FIG. 2, as well as the examples of FIGS. 3-4, without implementing the present techniques (so using prior approaches), the metadata needs to be triple mirrored for availability and durability, compared to the RAID protected data. This can result in a high overhead of metadata, which is then be stored on performance drives. In these examples, at least 3 performance drives are required to protect the metadata, which is be mirrored to enable write-in-place, and in these examples, the number of drives is well above that minimum, as 11 performance drives are needed to achieve the needed metadata capacity.

In contrast, when the metadata is fully log structured, it can be that one RAID protected copy of the metadata, with two parities, is sufficient to achieve Failures-To-Tolerate (FTT) of 2. This copy can be stored on the same capacity drives as the data, reducing the data capacity slightly (by approximately the amount of the 3% metadata footprint ratio that is assumed in FIG. 2—where FIG. 2 is constructed using exact calculations, and where it can be that this example does not hold at higher metadata ratios). This cost of capacity drive space can be worth the tradeoff, as the performance drive slots can be reclaimed to use for capacity drives, increasing the effective space available for data net of parity in the enclosure significantly (from 75.0% to 96.7%, or by 28.9% relatively, in this example).

The metadata change log can be stored as well. This change log can identify the set of changes that have not yet been incorporated into the log-structured copy. In this example, the size of the change log is 1% of the total metadata footprint, and this fraction can be dependent on many design and workload considerations, and can vary up or down in other examples. The change log can be stored on durable storage. The log record size for the delta metadata can be small, and it can be that this log is mirrored, not parity protected.

The approach that the present techniques facilitate can generally comprise a hybrid of log structure and in-place. One in-place copy of the metadata can be kept in performance SSDs. Modulo in-memory caching, read access to metadata can normally be done to this copy. An advantage of this can be that performance SSDs can have lower and more predictable read latency than is generally achievable by the capacity oriented SSDs.

To achieve the desired level of reliability, an additional copy of the metadata can be kept on the capacity SSDs. This copy can be RAID protected, and can be updated in bulk periodically in full stripe writes. This can improve both the write input/output (I/O) efficiency (since writes to this copy can be deferred and aggregated and therefore can be larger) and the capacity efficiency, since this copy of the metadata can be RAID protected instead of mirrored. Furthermore, since it can be that only one additional drive failure needs to be tolerated beyond the write-in-place copy, a single parity protection scheme can be used for this copy.

The log structure can lead to updates to be logged in a separate structure, and for these updates to be merged into the main copy later (this is the deferral, mentioned above). The change log can be structured as a log-structured merged (LSM) tree, which can comprise a data structure that can be implemented in storage systems for metadata updates. The upper layers of the LSM tree can be stored in the performance drives, allowing for frequent fine-grained updates. These layers can be mirrored as they can have relatively small capacity footprints. This can be mapped to the same performance SSDs as the write-in-place copy.

By maintaining a write-in-place copy of the metadata, referencing metadata from the LSM structure for normal metadata lookup operations can be avoided. This can be a saving where maintaining the in-memory structures that are used to quickly identify what layer of the LSM tree contains the current value of any metadata item can be avoided.

It can be that the upper layers of the LSM tree are kept in memory as well as on SSD drives. In that case, it can be possible on reference to first check for the presence of metadata in memory before referencing the in-place metadata copy on the performance drive(s).

An example approach to the log-structured metadata is that a base copy of the metadata is maintained, which can be the same structure as the in-place copy stored in the performance drives. This copy can regularly be out-of-date; it comprises a point-in-time image from the recent past. Different metadata structures can be captured at different points in time if they are fronted by different LSM merge trees. The LSM tree can comprise a set of recent metadata change log records, in different layers. Each layer can be the result of the most recent merge of logs from the layer above. At the top layer, a set of logs can be collected in time order, and these can be combined in time order and sorted into space order for merging into the next layer below.

Ultimately, at the bottom of the LSM, there can be the same on-drive structure as is stored for in-place reference.

In other examples, the metadata can be structured differently in this structure from the in-place structure, as long as the in-place structure can be restored from the alternative structure. An example can be to make the structure the same as the in-place structure.

On failure of the in-place structure (e.g., failure of one of the performance SSDs that store the in-place structure), recovery can involve the following steps:

1. For each block of the in-place copy that has been lost, the current content can be represented in the LSM tree. A selective merge can be performed to resolve the content of a block or set of blocks, up to the content of the entire tree. While this merge is happening, new metadata updates to that block's byte range can be suspended, which can block some upper layer operations. If merges are idempotent (which can be true of physical logs, and be not necessarily true of logical logs) and the tree maintains time ordering of insertions and updates, it can be that it is not necessary to merge the upper layers down entirely when constructing a current image of a specific block(s).
2. When the selective merge is complete, the up-to-date contents of the blocks can be copied to the in-place copy. The affected metadata structure byte range covered by the restored block(s) can then be returned to normal operation, including the combination of in-place and log-structured writes.
3. The operation described in step 1 can be performed as a byte-range read of the LSM tree, with the results constructed in memory. This can be because the LSM can contain in its combined layers all the current metadata, and this can be merged for the byte range of each missing block, with the merged result written to the in-place copy to replace the missing blocks.

Since the upper layers of LSM can be stored on the performance drives, the failure(s) that affect the in-place copy may also affect the LSM upper layers. In this case, since the upper layers of LSM can be either mirrored or RAID protected, those missing pieces can be recovered before proceeding with the rest of recovery. On failure of the capacity drives that affects the log-structured metadata copy, normal mapped RAID recovery can restore the lost metadata stripes. To reduce the number of performance drives, the same drives can be used for both the in-place copy and the LSM top of tree. Therefore, LSM top of tree can be protected against the maximum number of failures required to be tolerated, e.g., mirrored ×3 or RAID6 protected for FTT=2.

As can be seen from FIGS. 2-4, this approach can be intermediate between the fully log-structured approach and the in-place approach. The log-structured approach can have a disadvantage of requiring LSM lookups for metadata access, which can have a performance penalty, and also it can be that it does not provide a high-performance copy of the metadata for predictable low-latency read access.

On the other hand, the mirrored in-place approach can have a much greater metadata capacity footprint which can require high performance, high wear drives in numbers that can greatly reduce the overall capacity possible in the system for a given drive and slot count.

The proposed hybrid can have similar update performance to the in-place approach, since updates go first to the performance SSDs—the log side is destaged to capacity SSDs later when it can be deferred out of the latency path, and also can be RAID protected instead of mirrored.

The capacity row of FIG. 2 compares effective quantity of storage for data on a normalized basis relative to the amount of data storage capacity available (pre-RAID). In an ideal system, with all capacity drives and no metadata storage overhead, the factor would be 100%. The present techniques, with the assumed parameters, is nearly midway between the most cost-effective approach which is fully log-structured, and the least cost-effective approach, which is mirrored write-in-place.

The present techniques can facilitate a hybrid of the two approaches, achieving the performance benefits of in-place metadata, the capacity drive wear benefits of log structure, all while achieving an intermediate level of capacity delivered from the system at intermediate overall cost. This can make the present techniques a good option to consider when implementing a storage system to use high capacity, low wear drives, including quad-level cell (QLC) SSD drives.

Example Architectures, Etc.

FIG. 1 illustrates an example system architecture 100 that can facilitate reducing cost of metadata storage in a solid state drive-based storage system, in accordance with an embodiment of this disclosure.

System architecture 100 comprises computer system 102, communications network 104, and remote computer 106. In turn, computer system 102 comprises reducing cost of metadata storage in a solid state drive-based storage system component 108, performance drives 110 (comprising in-place metadata 114 and LSM tree (upper layers) 116), and capacity drives 112 (RAID) (comprising metadata log 118, and LSM tree (lower layers) 120).

Figure 10:
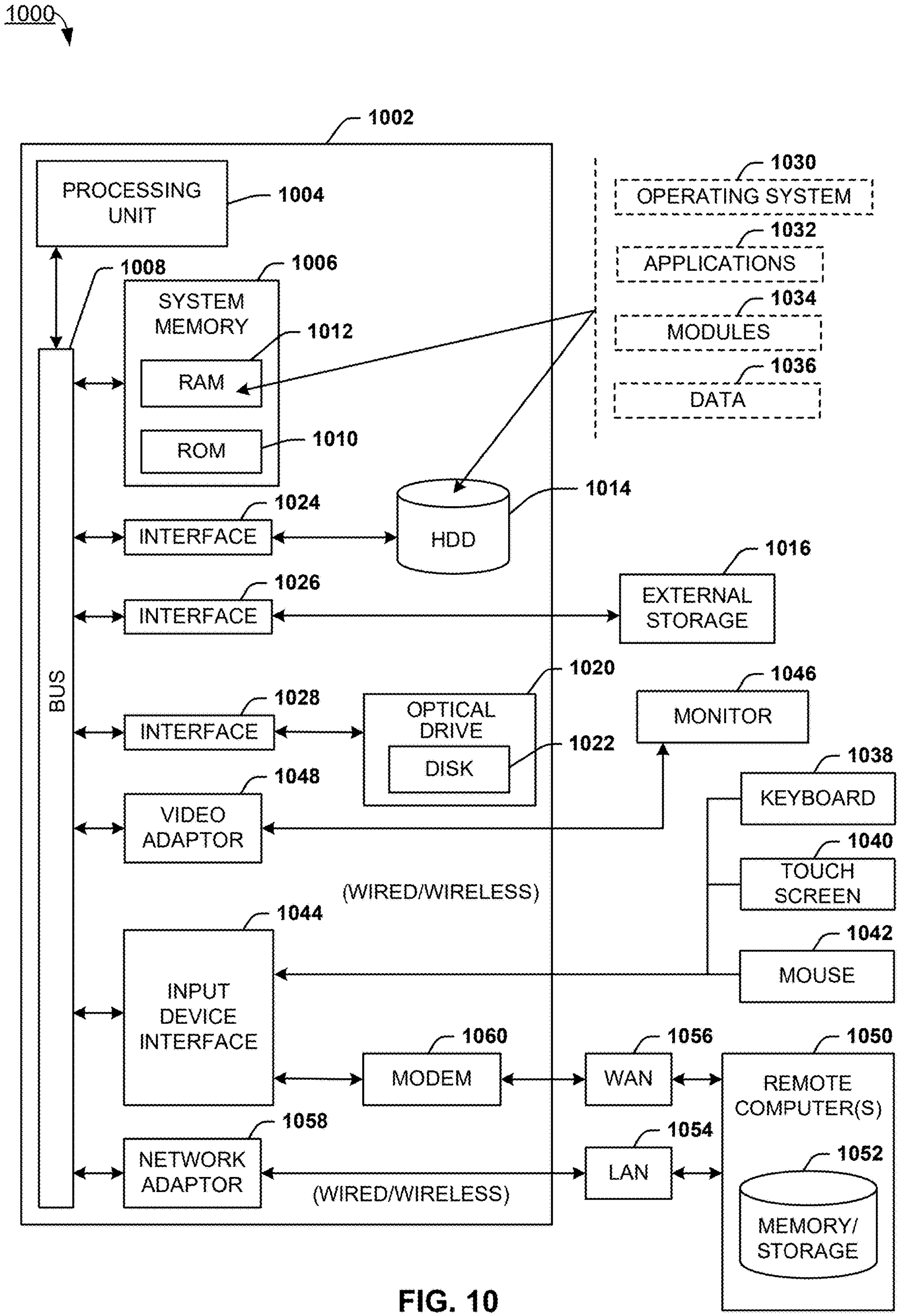
FIG. 10 illustrates an example block diagram of a computer operable to execute an embodiment of this disclosure.

Each of computer system 102 and/or remote computer 106 can be implemented with part(s) of computing environment 1000 of FIG. 10. Communications network 104 can comprise a computer communications network, such as the Internet.

Remote computer 106 can communicate with computer system 102 via communications network 104 to perform data operations on computer system 102, such as reading and writing data. Reducing cost of metadata storage in a solid state drive-based storage system component 108 can facilitate storing metadata of that data across performance drives 110 and capacity drives 112.

Performance drives 110 comprises in-place metadata 114 and LSM tree (upper layers) 116. In-place metadata 114 comprises metadata that is stored within the same storage location or data structure as its corresponding data, rather than stored separately in a separate index or database.

With respect to LSM tree (upper layers) 116 (and LSM tree (lower layers 120)), an upper layer can generally comprise a mutable in-memory structure (memtable) and/or sorted string table (SSTable), and upper layer operations can occur at these layers before data compaction happens in lower levels (which store data—for example—on disk in larger sorted, immutable SSTables).

In contrast to a general LSM structure, in some examples, an LSM according to the present techniques can collect changes to an overall set of metadata structures, first in persistent memory or in a sequential log on fast SSD. Once sufficient changes are collected, the log can be sorted by the order of the physical changes. Once several such sorted logs have been collected, they can be merged with other recently collected sorted logs to form an entry into another layer of the LSM tree. Several such layers can be constructed, each comprising a collection of sorted logs formed by the merging of smaller sorted logs from the layer above. At the bottom of the tree, the sorted log can be merged with the pre-existing metadata generation to create a new metadata generation. The actual value of any metadata location can be determined by searching the tree from top to bottom looking for records in the byte range of interest.

Capacity drives 120 comprises metadata log 118 and LSM tree (lower layers 120). Metadata log 118 can comprise collected groups of metadata that are written sequentially in a log structure, where changes are appended to the log rather than written in place.

In some examples, reducing cost of metadata storage in a solid state drive-based storage system component 108 can implement part(s) of the process flows of FIGS. 6-9 to implement reducing cost of metadata storage in a solid state drive-based storage system.

It can be appreciated that system architecture 100 is one example system architecture for reducing cost of metadata storage in a solid state drive-based storage system, and that there can be other system architectures that facilitate reducing cost of metadata storage in a solid state drive-based storage system.

FIG. 2 illustrates an example table 200 that describes reducing cost of metadata storage in a solid state drive-based storage system, in accordance with an embodiment of this disclosure. In some examples, part(s) of table 200 can be used by part(s) of system architecture 100 of FIG. 1 to facilitate reducing cost of metadata storage in a solid state drive-based storage system.

Table 200 compares three scenarios for storing metadata on a storage system: (1) in-place on performance drives, (2) log structured on capacity drives, (3) and a hybrid approach of the first two scenarios.

For these three scenarios, table 200 compares various metrics: percentage of capacity drive space used for data; related physical amount of metadata on performance drive; minimum number of performance drives in a 44-drive enclosure; data capacity as a percentage of raw maximum with all capacity drives; relative cost of storage v. all drives as capacity drives; and net logical data capacity normalized cost.

As can be seen in table 200, on the balance, the hybrid scenario provides-relative to the other two scenarios—an intermediate alternative balancing performance, system capacity, and cost.

FIG. 3 illustrates another example table 300 that describes reducing cost of metadata storage in a solid state drive-based storage system, in accordance with an embodiment of this disclosure. In some examples, part(s) of table 200 can be used by part(s) of system architecture 100 of FIG. 1 to facilitate reducing cost of metadata storage in a solid state drive-based storage system.

Table 300 illustrates example values used to determine the metrics in table 200 of FIG. 2 for the three example scenarios. These values are for a drive cost factor; log percent deferred; logical metadata footprint percentage; capacity drive size ratio; enclosure slot count; metadata parity ratio; data parity ratio; and metadata mirroring ratio.

FIG. 4 illustrates an example chart 400 of data capacity delivered, and that can facilitate reducing cost of metadata storage in a solid state drive-based storage system, in accordance with an embodiment of this disclosure. In some examples, part(s) of chart 400 can be used by part(s) of system architecture 100 of FIG. 1 to facilitate reducing cost of metadata storage in a solid state drive-based storage system.

Chart 400 illustrates the three scenarios of FIG. 2, for data capacity delivered at differing metadata footprint ratios (1%, 2%, 3%, 4%, and 5%). A metadata footprint ratio generally comprises a proportion of metadata size relative to total data size in a storage system.

As can be seen in chart, on the balance, the hybrid scenario is superior to the other two scenarios.

Figure 5:
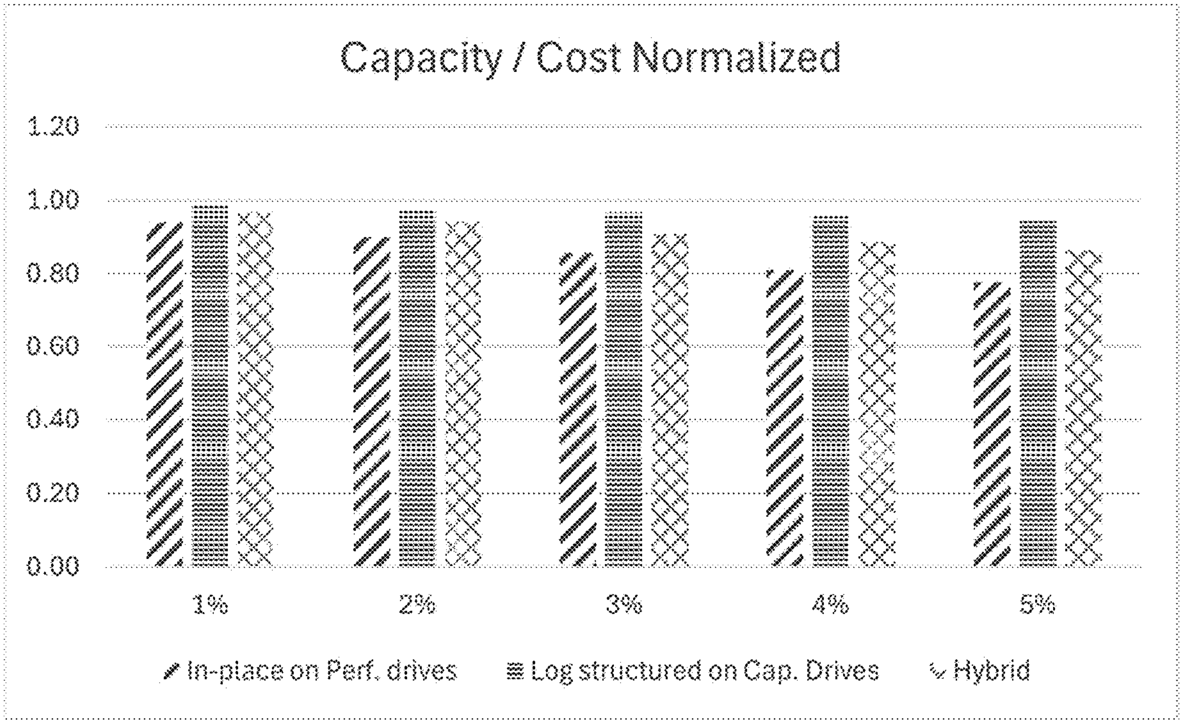
FIG. 5 illustrates an example chart of capacity/cost normalized, and that can facilitate reducing cost of metadata storage in a solid state drive-based storage system, in accordance with an embodiment of this disclosure.

FIG. 5 illustrates an example chart 500 of capacity/cost normalized, and that can facilitate reducing cost of metadata storage in a solid state drive-based storage system, in accordance with an embodiment of this disclosure. In some examples, part(s) of chart 500 can be used by part(s) of system architecture 100 of FIG. 1 to facilitate reducing cost of metadata storage in a solid state drive-based storage system.

Chart 400 illustrates the three scenarios of FIG. 2, for a ratio of storage capacity to cost ("capacity/cost"), which is normalized, and at the same differing metadata footprint ratios (1%, 2%, 3%, 4%, and 5%) as chart 400 of FIG. 4.

As can be seen in chart, on the balance, the hybrid scenario is superior to the other two scenarios.

Example Process Flows

Figure 6:
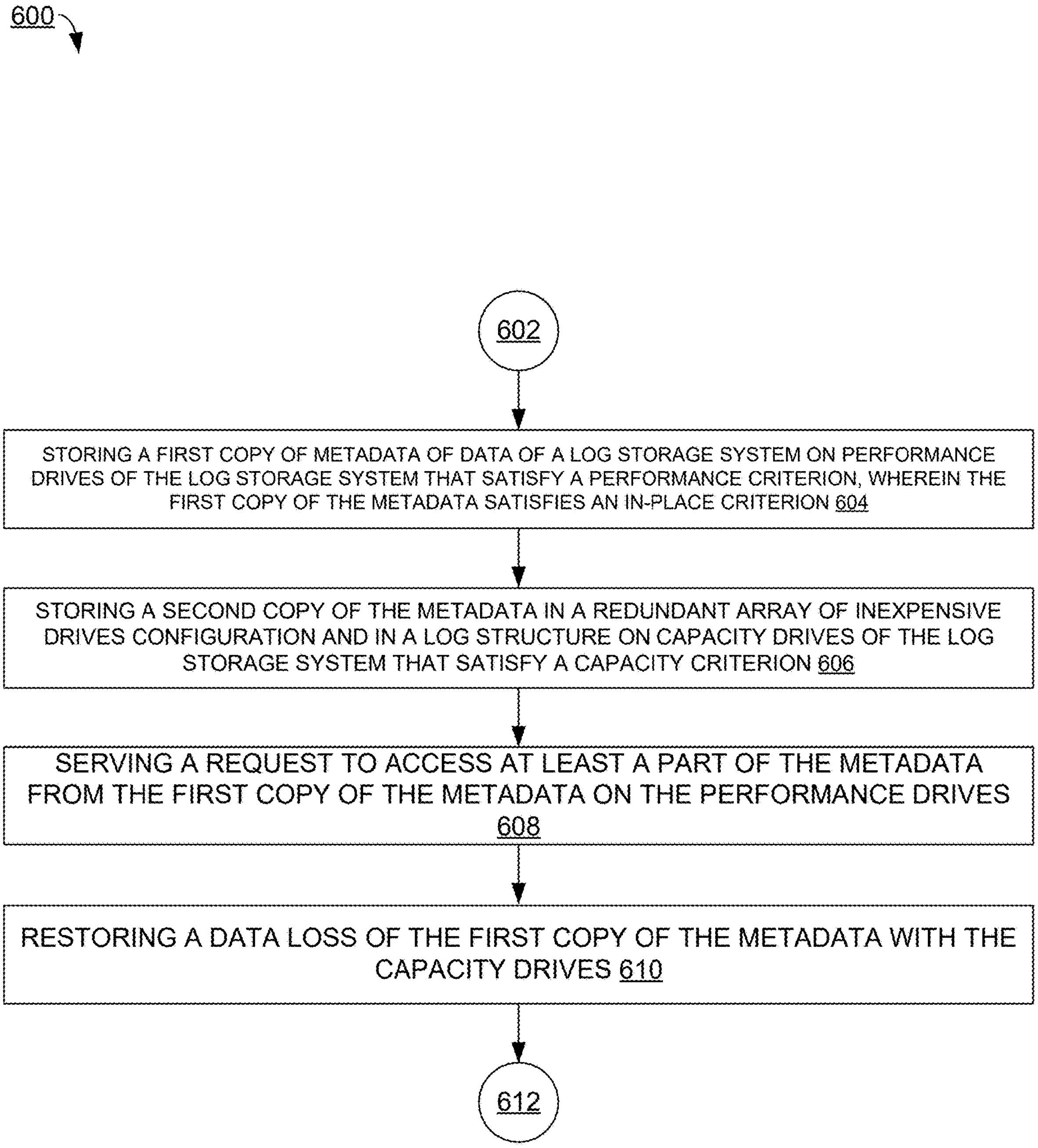
FIG. 6 illustrates an example process flow that can facilitate reducing cost of metadata storage in a solid state drive-based storage system, in accordance with an embodiment of this disclosure.

FIG. 6 illustrates an example process flow 600 that can facilitate reducing cost of metadata storage in a solid state drive-based storage system, in accordance with an embodiment of this disclosure. In some examples, one or more embodiments of process flow 600 can be implemented by reducing cost of metadata storage in a solid state drive-based storage system component 108 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, and/or process flow 800 of FIG. 8.

Process flow 600 begins with 602, and moves to operation 604.

Operation 604 depicts storing a first copy of metadata of data of a log storage system on performance drives of the log storage system that satisfy a performance criterion, wherein the first copy of the metadata satisfies an in-place criterion. That is, a log storage system can comprise multiple data storage tiers. Where data is written to the log storage system, one copy of the metadata can be stored in-place with the data on the performance drives.

After operation 604, process flow 600 moves to operation 606.

Operation 606 depicts storing a second copy of the metadata in a redundant array of inexpensive drives configuration and in a log structure on capacity drives of the log storage system that satisfy a capacity criterion. That is, in addition to the stored copy of the metadata in operation 604, at least two more copies of the metadata can be stored in the capacity drives. In some examples, the two additional copies can be stored as one copy, and one set of parity bits, where the parity bits comprise a parity checksum for the metadata copy and some other data that is stored on the capacity drives. For example, a parity bit can indicate whether the corresponding data has an odd or even number of 1s. Where the two pieces of stored data are 1, the parity bit can be 0. Where the two pieces of stored data are 0, the parity bit can also be 0. Where the two pieces of stored data are one 1 and one 0, the parity bit can be 1. In this manner, if one drive suffers data loss, the data on the drive can be restored using the other data and the parity bits.

It can be that the RAID protected copy on the capacity drives is in the same layout and format (in some examples, in other examples, there can be variations on the format) as the in-place copy. What can be different between the two ways the metadata is stored is that the changes to the RAID protected copy (that is, the metadata updates) can be stored in a log structure, on-memory or on-disk, on performance disk or capacity disk, per performance and capacity requirements/desires. It can be that the log and the RAID protected base copy are rarely accessed, and then only for recovery purposes.

So, it can be that the logs are “above” a RAID protected base copy on the capacity drives, and the logs are to be persisted and protected, but could be on any class of storage, or even different layers could be on different classes of storage.

The log structure can contain changes to a base copy of the metadata, where the base copy can be updated periodically by merging the changes into the base copy. The log structure can store the changes to the base copy of the metadata as updates to byte ranges (physically logging). Merging the changes can proceed from a top of the log structure to a bottom of the log structure.

After operation 606, process flow 600 moves to operation 608.

Operation 608 depicts serving a request to access at least a part of the metadata from the first copy of the metadata on the performance drives. That is, metadata requests can be served with the copy of the metadata on the performance drives, where the performance drives can be more performant (e.g., have a lower latency for data access) compared to the capacity drives.

After operation 608, process flow 600 moves to operation 610.

Operation 610 depicts restoring a data loss of the first copy of the metadata with the capacity drives. That is, where the performance drives suffer data loss (e.g., a drive fails), the metadata on the performance drives can be restored with the copy/copies of the metadata on the capacity drives.

After operation 610, process flow 600 moves to 612, where process flow 600 ends.

Figure 7:
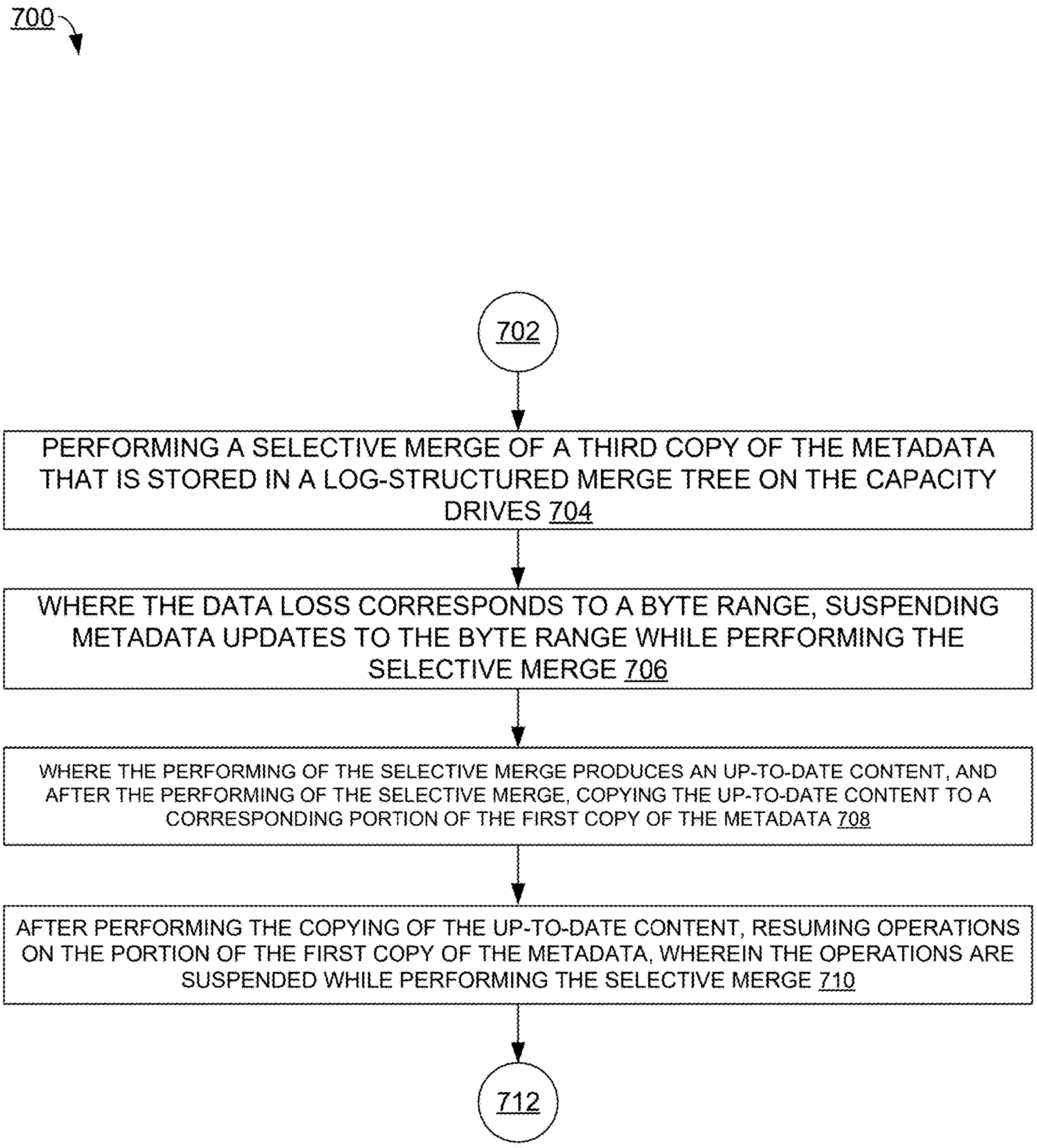
FIG. 7 illustrates another example process flow that can facilitate reducing cost of metadata storage in a solid state drive-based storage system, in accordance with an embodiment of this disclosure.

FIG. 7 illustrates another example process flow 700 that can facilitate reducing cost of metadata storage in a solid state drive-based storage system, in accordance with an embodiment of this disclosure. In some examples, one or more embodiments of process flow 700 can be implemented by reducing cost of metadata storage in a solid state drive-based storage system component 108 of FIG. 1, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, and/or process flow 800 of FIG. 8.

In some examples, part(s) of process flow 700 can be used to implement operation 610 of FIG. 6 to restore from data loss.

Process flow 700 begins with 702, and moves to operation 704.

Operation 704 depicts performing a selective merge of the second copy of the metadata. That is, for each block of the in-place copy that has been lost, the current content can be represented in a LSM tree. A selective merge can be performed to resolve the content of a block or set of blocks, up to the content of the entire tree.

In some examples, the log-structured merge tree maintains a time ordering of metadata insertions and metadata updates, and the performing of the selective merge omits a merging of at least a portion of the log-structured merge tree that is inapplicable to the restoring of the data loss. In some examples, the log-structured merge tree omits a time ordering of metadata insertions and metadata updates. That is, where merges are idempotent (which can be true of physical logs, and be not necessarily true of logical logs) and the tree maintains time ordering of insertions and updates, it can be that it is not necessary to merge the layers down entirely when constructing a current image of a specific block(s).

That is, what is omitted from a selective merge can be some or all log content that is not applicable to the lost data blocks that are being recovered. It can be that the lost areas of the metadata can be recovered to establish the correct values to rewrite into the in-place copy.

Performing the merge can comprise applying all pending changes, in a proper time order, that have been captured in the log structure, before applying the merged result to restore the in-place copy. A reduced scope of the merge can be an optimization, and there can be examples that perform a complete merge, and then copy over the lost regions. In some examples where the entire in-place copy is lost, a full merge can be performed to re-establish current correct metadata values.

In some examples, the performing of the selective merge comprises performing a byte-range read of the log-structured merge tree.

In some examples, at least one memory of a system that implements process flow 700 is at least one first memory, and the performing of the selective merge comprises constructing a portion of the first copy of the metadata that corresponds to the byte-range read of the log-structured merge tree in a second memory of the system, wherein the second memory comprises non-volatile memory. That is, operation 704 can be performed as a byte-range read of the LSM tree, with the results constructed in memory. This can be because the LSM can contain in its combined layers all the current metadata, and this can be merged for the byte range of each missing block, with the merged result written to the in-place copy to replace the missing blocks.

With respect to the second memory being non-volatile, this can comprise, for example, SSDs or optane memory.

After operation 704, process flow 700 moves to operation 706.

Operation 706 depicts, where the data loss corresponds to a byte range, suspending metadata updates to the byte range while performing the selective merge. That is, the merge of operation 704 is happening, new metadata updates to that block(s) byte range can be suspended, which can block some upper layer operations.

After operation 706, process flow 700 moves to operation 708.

Operation 708 comprises, where the performing of the selective merge produces an up-to-date content that corresponds to at least one block range that is affected by the data loss, and after the performing of the selective merge, copying the up-to-date content to a corresponding portion of the first copy of the metadata. That is, when the selective merge of operation 704 is complete, the up-to-date contents of the blocks can be copied to the in-place copy.

After operation 708, process flow 700 moves to operation 710.

Operation 710 comprises, after performing the copying of the up-to-date content, resuming read operations on the portion of the first copy of the metadata, and resuming write operations to the first copy of the metadata and to the second copy of the metadata, wherein the read operations and the write operations are suspended while performing the selective merge. That is, the affected metadata structure byte range covered by the restored block(s) can then be returned to normal operation, including the combination of in-place and log-structured writes.

After operation 710, process flow 700 moves to 712, where process flow 700 ends.

Figure 8:
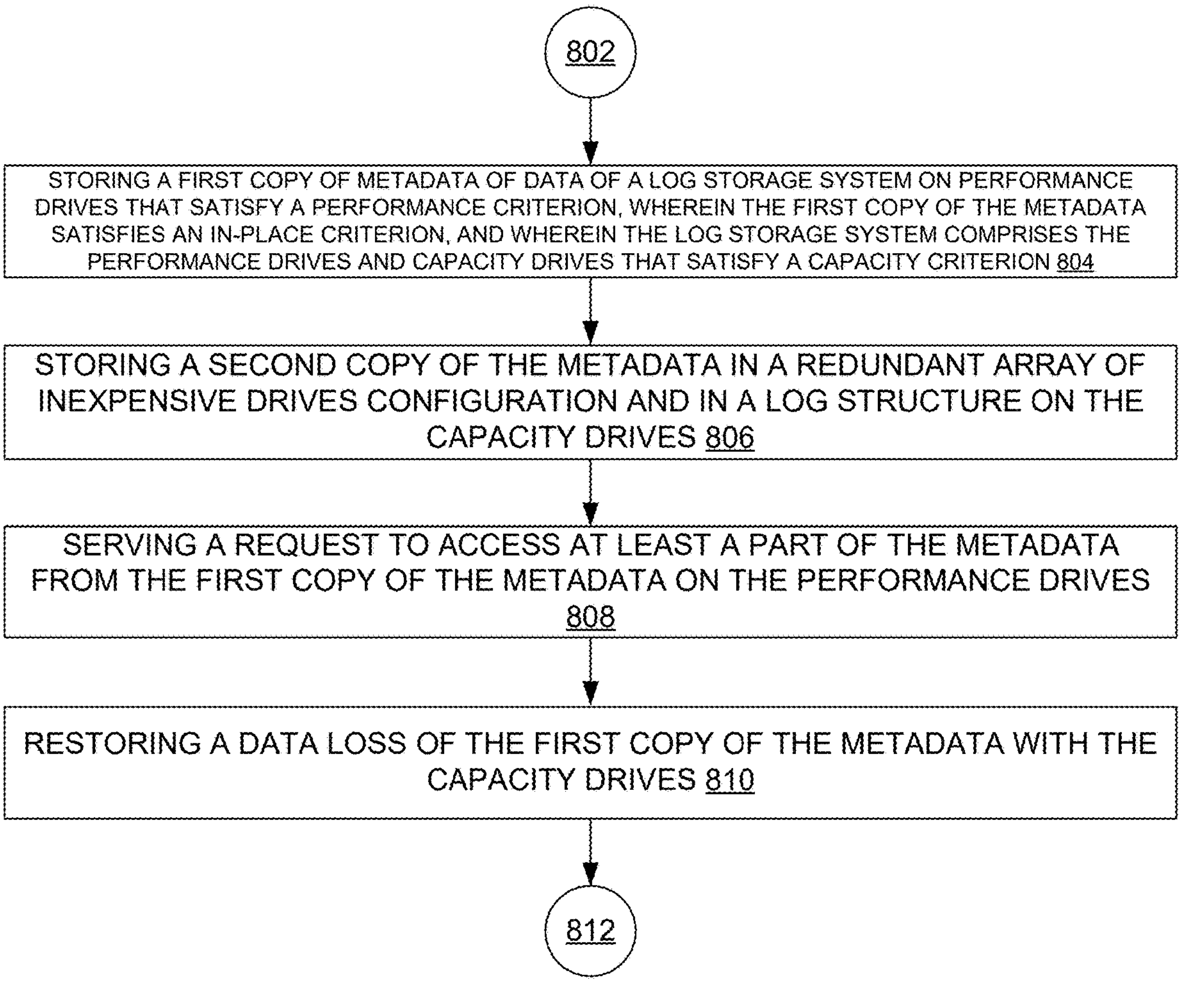
FIG. 8 illustrates another example process flow that can facilitate reducing cost of metadata storage in a solid state drive-based storage system, in accordance with an embodiment of this disclosure.

FIG. 8 illustrates another example process flow 800 that can facilitate reducing cost of metadata storage in a solid state drive-based storage system, in accordance with an embodiment of this disclosure. In some examples, one or more embodiments of process flow 800 can be implemented by reducing cost of metadata storage in a solid state drive-based storage system component 108 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, and/or process flow 700 of FIG. 7.

Process flow 800 begins with 802, and moves to operation 804.

Operation 804 depicts storing a first copy of metadata of data of a log storage system on performance drives that satisfy a performance criterion, wherein the first copy of the metadata satisfies an in-place criterion, and wherein the log storage system comprises the performance drives and capacity drives that satisfy a capacity criterion. In some examples, operation 804 can be implemented in a similar manner as operation 604 of FIG. 6.

After operation 804, process flow 800 moves to operation 806.

Operation 806 depicts storing a second copy of the metadata in a redundant array of inexpensive drives configuration and in a log structure on the capacity drives. In some examples, operation 806 can be implemented in a similar manner as operation 606 of FIG. 6.

In some examples, the redundant array of inexpensive drives configuration comprise a single parity protection scheme. That is, there can be scenarios where the storage system is designed to tolerate one additional drive failure beyond a write-in-place copy, so the additional drive failure is protected using a single parity protection scheme.

After operation 806, process flow 800 moves to operation 808.

Operation 808 depicts serving a request to access at least a part of the metadata from the first copy of the metadata on the performance drives. In some examples, operation 808 can be implemented in a similar manner as operation 608 of FIG. 6.

After operation 808, process flow 800 moves to operation 810.

Operation 810 depicts restoring a data loss of the first copy of the metadata with the capacity drives. In some examples, operation 810 can be implemented in a similar manner as operation 610 of FIG. 6.

In some examples, the restoring of the data loss comprises, based on the data loss affecting at least the part of a log-structured merge tree that is stored on the performance drives, recovering at least the part of the log-structured merge tree. In some examples, the recovering of at least the part of the log-structured merge tree is performed based on the capacity drives. That is, where the upper layers of LSM are stored on the performance drives, the failure(s) that affect the in-place copy can also affect the LSM upper layers. In this case, since the upper layers of LSM can be either mirrored or RAID protected, those missing pieces can be recovered before proceeding with the rest of recovery. On failure of the capacity drives that affects the log-structured metadata copy, normal mapped RAID recovery can restore the lost metadata stripes. To reduce the number of performance drives, the same drives can be used for both the in-place copy and the LSM top of tree. Therefore, LSM top of tree can be protected against the maximum number of failures required to be tolerated, e.g., mirrored ×3 or RAID6 protected for FTT=2.

Upper layers of the log structure can be placed so as to avoid a situation where losing a SSD can compromise the corresponding in-place copy and the top of the log. The avoid this situation, the top of the log can be performed, e.g., FTT=2, where it is stored on a performance SSD shared with the in-place copy of the metadata. If it is stored elsewhere, then it can be that there is an effective need of FTT=1 for the log copy including the top of the log, as in combination with the in-place copy that gives FTT=2.

After operation 810, process flow 800 moves to 812, where process flow 800 ends.

Figure 9:
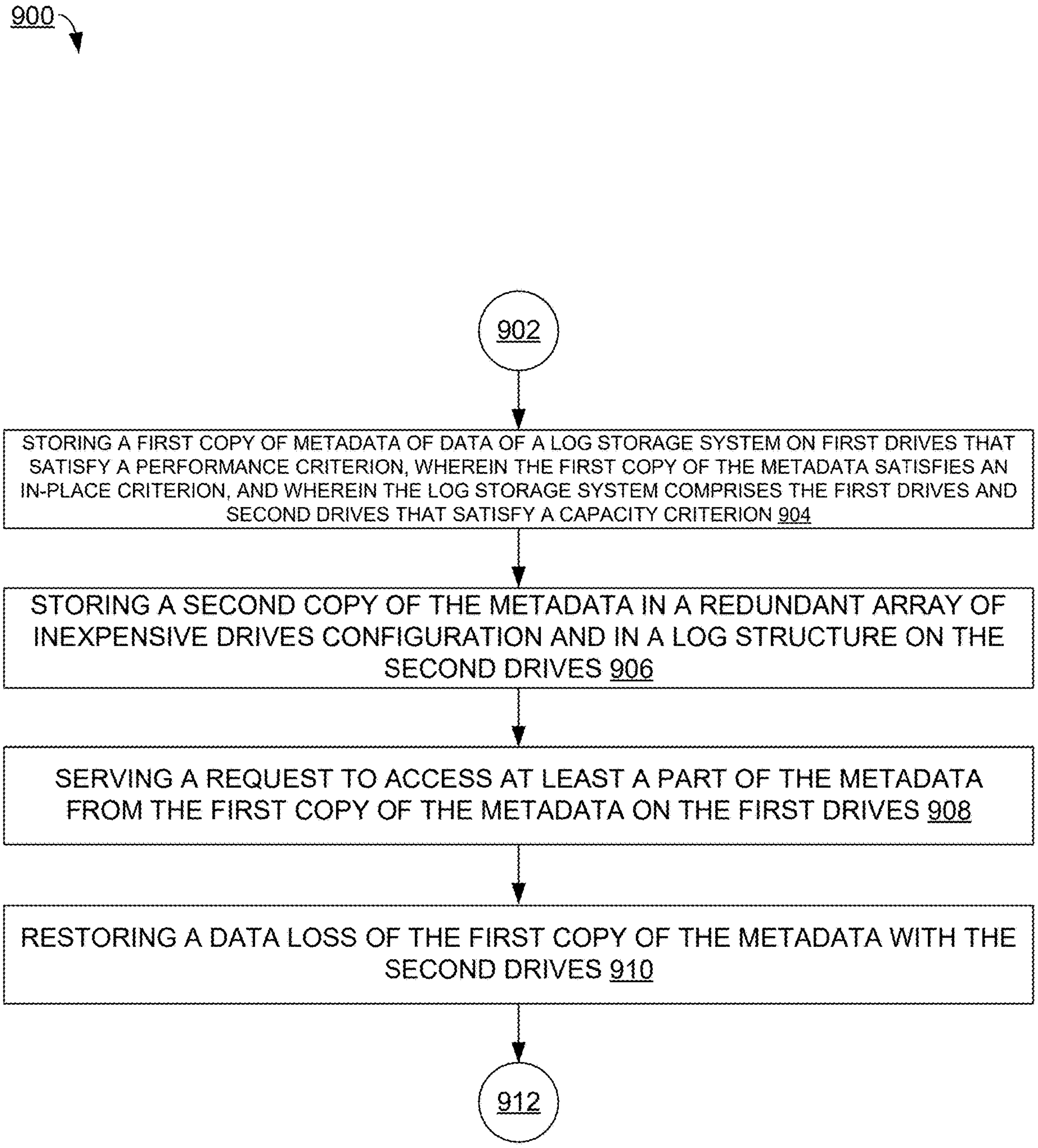
FIG. 9 illustrates another example process flow that can facilitate reducing cost of metadata storage in a solid state drive-based storage system, in accordance with an embodiment of this disclosure.

FIG. 9 illustrates another example process flow 900 that can facilitate reducing cost of metadata storage in a solid state drive-based storage system, in accordance with an embodiment of this disclosure. In some examples, one or more embodiments of process flow 800 can be implemented by reducing cost of metadata storage in a solid state drive-based storage system component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, and/or process flow 700 of FIG. 7.

Process flow 900 begins with 902, and moves to operation 904.

Operation 904 depicts storing a first copy of metadata of data of a log storage system on first drives that satisfy a performance criterion, wherein the first copy of the metadata satisfies an in-place criterion, and wherein the log storage system comprises the first drives and second drives that satisfy a capacity criterion. In some examples, operation 904 can be implemented in a similar manner as operation 604 of FIG. 6.

In some examples, the second copy of the metadata comprises a log-structured merge tree that separates logged changes to the metadata from a base copy of the metadata. In some examples, operation 904 comprises storing at least one layer of the log-structured merge tree that satisfies an upper-layer criterion on the first drives. In some examples, the storing of the at least one layer of the log-structured merge tree that satisfies the upper-layer criterion on the first drives comprises storing the at least one layer on a first drive of the first drives, wherein the metadata is stored on the first drive.

That is, a log structure of a file system can lead to updates to be logged in a separate structure, and for these updates to be merged into the main copy later (this is the deferral, mentioned above). The change log can be structured as a log-structured merged (LSM) tree, which can comprise a data structure that can be implemented in storage systems for metadata updates. The upper layers of the LSM tree can be stored in the performance drives, allowing for frequent fine-grained updates. These layers can be mirrored as they can have relatively small capacity footprints. This can be mapped to the same performance SSDs as the write-in-place copy.

The LSM tree can comprise an implementation of a single protected copy of the entire metadata, stored in a write-efficient way on SSDs by separating logged recent changes from the in-line base copy, and periodically merging changes into the base copy by writing it again, and freeing the previous copy.

It can be that all contents in all tiers of the LSM tree are to be protected. In some examples, this can be done most efficiently for lower tiers by writing them to disk (SSD). For the very top tier, where there is persistent memory, changes can be copied between two or more persistent memories to protect them against one or more failures. Or, in some examples, on the commit of each transaction, new changes can be flushed to SSD. These different approaches can have different performance where writing to memory is much faster than writing to disk.

After operation 904, process flow 900 moves to operation 906.

Operation 906 depicts storing a second copy of the metadata in a redundant array of inexpensive drives configuration and in a log structure on the second drives. In some examples, operation 906 can be implemented in a similar manner as operation 606 of FIG. 6.

After operation 906, process flow 900 moves to operation 908.

Operation 908 depicts serving a request to access at least a part of the metadata from the first copy of the metadata on the first drives. In some examples, operation 908 can be implemented in a similar manner as operation 608 of FIG. 6.

In some examples, the log-structured merge tree omits in-memory structures. In some examples, the serving of the request to read at least the part of the metadata is performed independently of the log-structured merge tree. That is, by maintaining a write-in-place copy of the metadata, referencing metadata from the LSM structure for normal metadata lookup operations can be avoided. This can be a saving where maintaining the in-memory structures that are used to quickly identify what layer of the LSM tree contains the current value of any metadata item can be avoided.

After operation 908, process flow 900 moves to operation 910.

Operation 910 depicts restoring a data loss of the first copy of the metadata with the second drives. In some examples, operation 910 can be implemented in a similar manner as operation 610 of FIG. 6.

After operation 910, process flow 900 moves to 912, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of computer system 102 and/or remote computer 106.

In some examples, computing environment 1000 can implement one or more embodiments of the process flows of FIGS. 6-9 to facilitate reducing cost of metadata storage in a solid state drive-based storage system.

While the embodiments have been described above in the general context of computer-executable instructions that can run on one or more computers, those skilled in the art will recognize that the embodiments can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FD D) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can also be connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (A P) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include W ireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

storing a first copy of metadata of data of a log storage system on performance drives of the log storage system that satisfy a performance criterion, wherein the first copy of the metadata satisfies an in-place criterion;

storing a second copy of the metadata in a redundant array of inexpensive drives configuration and in a log structure on capacity drives of the log storage system that satisfy a capacity criterion;

serving a request to access at least a part of the metadata from the first copy of the metadata on the performance drives; and restoring a data loss of the first copy of the metadata with the capacity drives.

2. The system of claim 1, wherein the restoring of the data loss comprises:

performing a selective merge of the second copy of the metadata.

3. The system of claim 2, wherein the data loss corresponds to a byte range, and wherein the operations further comprise:

suspending metadata updates to the byte range while performing the selective merge.

4. The system of claim 2, wherein the log-structured merge tree maintains a time ordering of metadata insertions and metadata updates, and wherein the performing of the selective merge omits a merging of at least a portion of the log-structured merge tree that is inapplicable to the restoring of the data loss.

5. The system of claim 2, wherein the log-structured merge tree omits a time ordering of metadata insertions and metadata updates.

6. The system of claim 2, wherein the performing of the selective merge produces an up-to-date content that corresponds to at least one block range that is affected by the data loss, and wherein the operations further comprise:

after the performing of the selective merge, copying the up-to-date content to a corresponding portion of the first copy of the metadata.

7. The system of claim 6, wherein the operations further comprise:

after performing the copying of the up-to-date content, resuming read operations on the portion of the first copy of the metadata, and resuming write operations to the first copy of the metadata and to the second copy of the metadata, wherein the read operations and the write operations are suspended while performing the selective merge.

8. The system of claim 2, wherein the performing of the selective merge comprises:

performing a byte-range read of the log-structured merge tree.

9. The system of claim 8, wherein the at least one memory is at least one first memory, and wherein the performing of the selective merge comprises:

constructing a portion of the first copy of the metadata that corresponds to the byte-range read of the log-structured merge tree in a second memory of the system, wherein the second memory comprises non-volatile memory.

10. A method, comprising:

storing, by a system comprising at least one processor, a first copy of metadata of data of a log storage system on performance drives that satisfy a performance criterion, wherein the first copy of the metadata satisfies an in-place criterion, and wherein the log storage system comprises the performance drives and capacity drives that satisfy a capacity criterion;

storing, by the system, a second copy of the metadata in a redundant array of inexpensive drives configuration and in a log structure on the capacity drives;

serving, by the system, a request to access at least a part of the metadata from the first copy of the metadata on the performance drives; and restoring, by the system, a data loss of the first copy of the metadata with the capacity drives.

11. The method of claim 10, wherein the restoring of the data loss comprises:

based on the data loss affecting at least the part of a log-structured merge tree that is stored on the performance drives, recovering, by the system, at least the part of the log-structured merge tree.

12. The method of claim 11, wherein the recovering of at least the part of the log-structured merge tree is performed based on the capacity drives.

13. The method of claim 10, wherein the restoring of the data loss comprises:

performing a selective merge of the second copy of the metadata.

14. The method of claim 10, wherein the redundant array of inexpensive drives configuration comprise a single parity protection scheme.

15. A non-transitory computer-readable medium comprising instructions that, in response to execution, cause a system comprising at least one processor to perform operations, comprising:

storing a first copy of metadata of data of a log storage system on first drives that satisfy a performance criterion, wherein the first copy of the metadata satisfies an in-place criterion, and wherein the log storage system comprises the first drives and second drives that satisfy a capacity criterion;

storing a second copy of the metadata in a redundant array of inexpensive drives configuration and in a log structure on the second drives;

serving a request to access at least a part of the metadata from the first copy of the metadata on the first drives; and restoring a data loss of the first copy of the metadata with the second drives.

16. The non-transitory computer-readable medium of claim 15, wherein the second copy of the metadata comprises a log-structured merge tree that separates logged changes to the metadata from a base copy of the metadata.

17. The non-transitory computer-readable medium of claim 16, wherein the operations further comprise:

storing at least one layer of the log-structured merge tree that satisfies an upper-layer criterion on the first drives.

18. The non-transitory computer-readable medium of claim 17, wherein the storing of the at least one layer of the log-structured merge tree that satisfies the upper-layer criterion on the first drives comprises:

storing the at least one layer on a first drive of the first drives, wherein the metadata is stored on the first drive.

19. The non-transitory computer-readable medium of claim 16, wherein the log-structured merge tree omits in-memory structures.

20. The non-transitory computer-readable medium of claim 16, wherein the serving of the request to read at least the part of the metadata is performed independently of the log-structured merge tree.

* * * * *